(12) United States Patent
Uematsu et al.

(10) Patent No.: US 10,099,447 B2
(45) Date of Patent: Oct. 16, 2018

(54) STRUCTURAL BODY AND CORE

(71) Applicant: KABUSHIKI KAISHA TOSHIBA, Minato-ku (JP)

(72) Inventors: Ikuo Uematsu, Yokohama (JP); Naoya Hayamizu, Yokohama (JP); Kenya Uchida, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/384,673

(22) Filed: Dec. 20, 2016

(65) Prior Publication Data

US 2017/0100913 A1    Apr. 13, 2017

Related U.S. Application Data

(63) Continuation of application No. PCT/JP2016/058590, filed on Mar. 17, 2016.

(30) Foreign Application Priority Data

Mar. 17, 2015  (JP) ................................. 2015-053452

(51) Int. Cl.
*B32B 5/02* (2006.01)
*B32B 5/26* (2006.01)

(52) U.S. Cl.
CPC ............... *B32B 5/022* (2013.01); *B32B 5/26* (2013.01); *B32B 2363/00* (2013.01); *B32B 2603/00* (2013.01)

(58) Field of Classification Search
CPC ...................................... B32B 5/022

USPC ........................................................ 428/76
See application file for complete search history.

(56) References Cited

U.S. PATENT DOCUMENTS

2012/0178332 A1    7/2012  Uchida et al.

FOREIGN PATENT DOCUMENTS

| CN | 102112308 A | 6/2011 |
| JP | 3-52248 U | 5/1991 |
| JP | 2002-141628 | 5/2002 |
| JP | 2002-249966 | 9/2002 |
| JP | 2004-234581 | 8/2004 |
| JP | 2006-105286 | 4/2006 |
| JP | 2007-51214 | 3/2007 |
| JP | 2008-69474 | 3/2008 |
| JP | 2008-69478 | 3/2008 |
| JP | 2009-262529 | 11/2009 |
| JP | 2012-197644 | 10/2012 |
| JP | 5105352 | 12/2012 |
| JP | 2014-80491 | 5/2014 |
| JP | 2014-234581 | 12/2014 |

(Continued)

OTHER PUBLICATIONS

International Search Report (with Written Opinion) dated Apr. 19, 2016 in PCT/JP2016/058590 filed Mar. 17, 2016 (with English translation).

(Continued)

*Primary Examiner* — Brent T O'Hern
(74) *Attorney, Agent, or Firm* — Oblon, McClelland, Maier & Neustadt, L.L.P.

(57) ABSTRACT

According to one embodiment, there is provided a structural body including a core composed of fiber and a support, which is a component of the core and is in contact with the core.

4 Claims, 8 Drawing Sheets

(56) References Cited

FOREIGN PATENT DOCUMENTS

JP         2014234581 A  * 12/2014
WO    WO 2011/052175 A1    5/2011

OTHER PUBLICATIONS

Written Opinion dated Apr. 19, 2016 in PCT/JP2016/058590 filed Mar. 17, 2016.
Office Action issued in Japanese Patent Application 2016-555387 dated Oct. 25, 2016 with English translation.
Japanese Office Action dated Feb. 7, 2017 in Patent Application No. 2016-555387 (without English Translation).
Shinji Imaizumi et al., "Phenolic Resin-Based Carbon Thin Fibers Prepared by Electrospinning: Additive Effects of Poly(vinyl butyral) and Electrolytes", Polymer Journal, vol. 41, No. 12, Oct. 21, 2009, pp. 1124-1128.
Combined Chinese Office Action and Search Report dated May 3, 2017 in Patent Application No. 201680000969.6 (with English language translation of categories of cited documents).

* cited by examiner

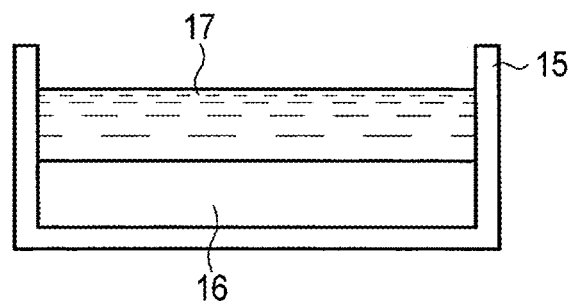
F I G. 9
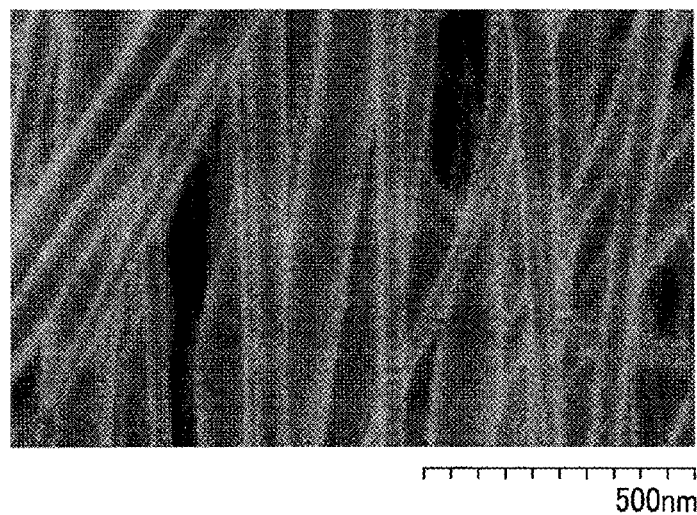
F I G. 10

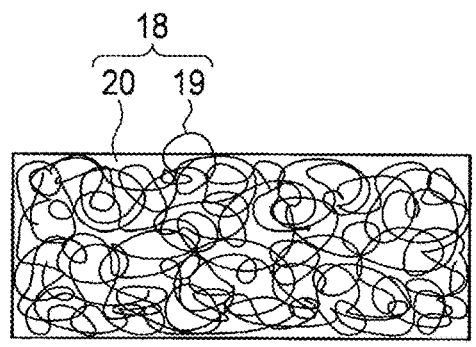
F I G. 11
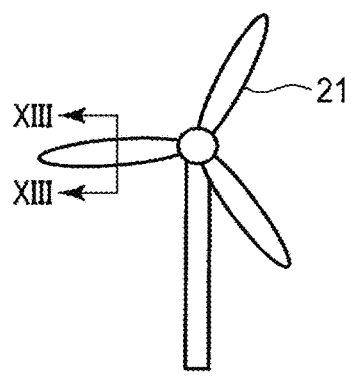
F I G. 12
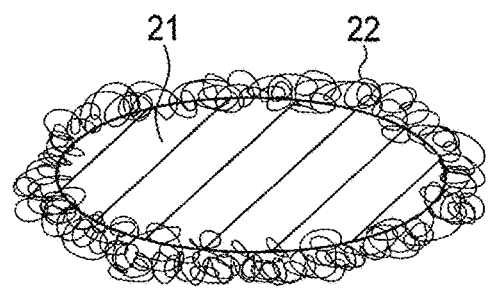
F I G. 13

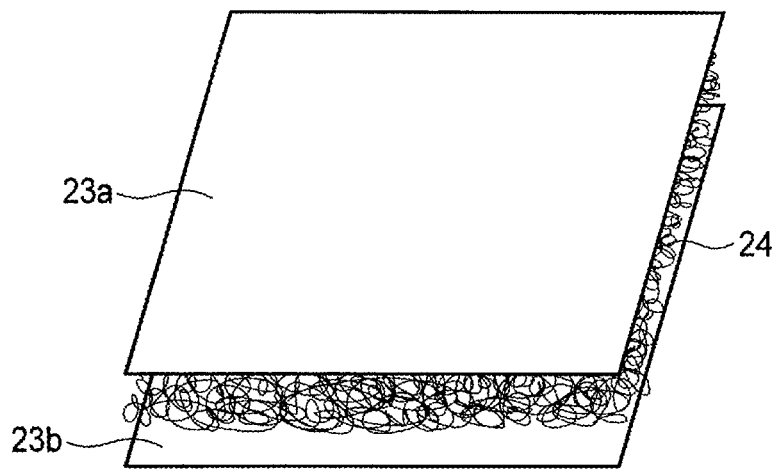
F I G. 14
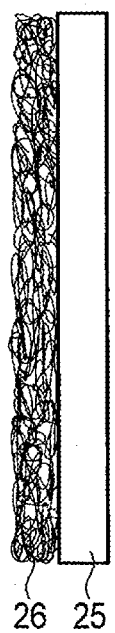
F I G. 15

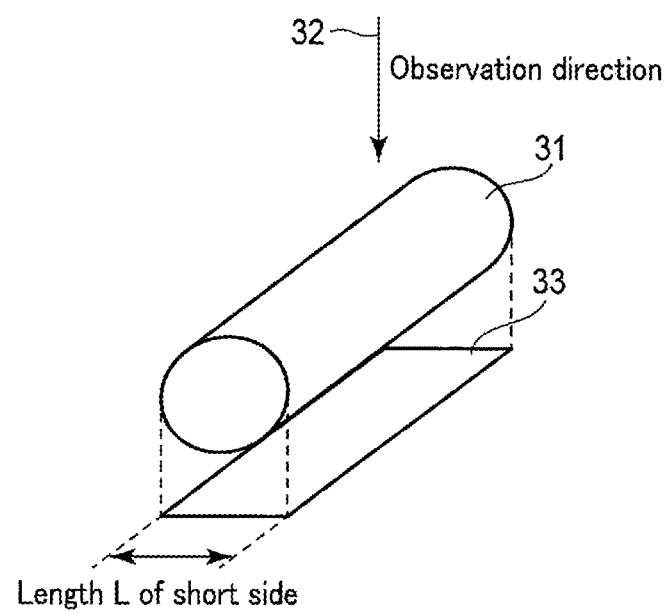
F I G. 16

STRUCTURAL BODY AND CORE

CROSS-REFERENCE TO RELATED APPLICATIONS

This is a Continuation application of PCT Application No. PCT/JP2016/058590, filed Mar. 17, 2016, and is based upon and claims the benefit of priority from Japanese Patent Application No. 2015-053452, filed Mar. 17, 2015, the entire contents of all of which are incorporated herein by reference.

FIELD

Embodiments of the present invention relate to a structural body including a core made of fiber and a core that composes the structural body.

BACKGROUND

Conventionally, a structural body including a core made of fiber has been considered. As the fiber that composes this type of structural body, for example, a fine fiber made of polymeric material such as those disclosed in Japanese Patent Application KOKAI Publication No. 2002-249966 is considered. However, there is a problem in that the structural body with a core composed of fiber has a weak structural strength, due to its structure.

BRIEF DESCRIPTION OF THE DRAWINGS

FIG. 9 is a pattern diagram showing an example of use as a biomaterial sheet.

FIG. 10 is an electron micrograph showing an example of an oriented collagen sheet.

FIG. 11 is a schematic view showing an example of an insulating material and an insulating auxiliary material.

FIG. 12 is a schematic view showing an example of use as a water droplet impact absorbing member.

FIG. 13 is a cross-sectional view taken along line XIII-XIII of FIG. 12.

FIG. 14 is a schematic view showing an example of use as an adhesive layer.

FIG. 15 is a schematic view showing an example of use as a surface layer of a barrier membrane.

FIG. 16 is a schematic view showing a projection view of a fiber in an observation direction.

DETAILED DESCRIPTION

According to one embodiment, there is provided a structural body including a core composed of fiber and a support, which is a component of the core, and is capable of suppressing deformation of the core.

According to another embodiment, there is provided a structural body including at least one porous layer that includes an electrolyte and a fiber including a thermosetting resin.

According to yet another embodiment there is provided a structural body including a stack that includes plural porous layers. The plural porous layers include a resin with a density of 0.5 g/cm$^3$ to 3 g/cm$^3$ and a fiber with an average diameter of 30 nm or more and less than 5 μm. A porosity of the porous layers is within a range of 45% to 95%.

Furthermore, according to still another embodiment, there is provided a structural body including a core composed of fiber and a support, which is a component of the core and is in contact with the core.

Figure 1:
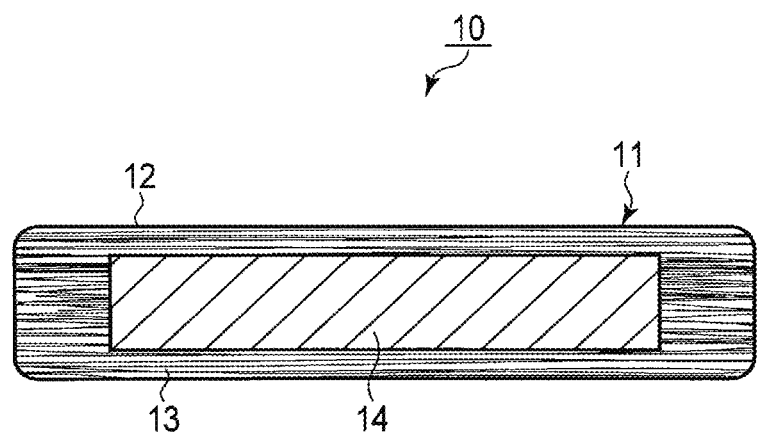
FIG. 1 is a cross-sectional view showing a configurational example of a structural body according to an embodiment.

Hereinafter, an embodiment will be described with reference to the drawings. A structural body 10 illustrated in FIG. 1 has a structure in which a core 11 that composes a main body portion of the structural body 10 is housed in a covering member 12. The core 11 includes a fiber 13 and a support 14. The covering member 12 composes a surface portion of the structural body 10. The covering member 12 is composed of any of a metal material, an organic material, and an inorganic material or a sheet material formed of a combination of these materials. In the present case, the covering member 12 is configured to have a sac-like shape which can house the core 11 formed of the fiber 13 and the support 14. In the covering member 12, the support 14 is covered with the fiber 13. The covering member 12 need not cover the entire core 11, but may be configured to cover a portion of the core 11.

The fiber 13 is formed of randomly entangled resin fibers. In the present case, the fiber 13 is molded by an electrospinning method. The fiber 13 formed by the electrospinning method becomes a thin fiber having an outer diameter of about 0.1 nm to 10 μm, and at the same time, a long fiber having a length that is equal to 1000 times or more of the outer diameter, for example. Further, the fiber 13 formed by the electrospinning method is not entirely linear, but has a randomly curved crimp shape. Accordingly, there is more entangling of the fibers with each other.

In the present case, the fiber 13 is formed of an organic polymer whose density is smaller than that of glass. By forming the fiber 13 with a polymer having a density smaller than that of glass, the weight of the fiber 13 can be reduced. The fiber 13 may be formed by mixed spinning of one or two or more polymers selected from polystyrene, polycarbonate, polymethyl methacrylate, polypropylene, polyethylene, polyethylene terephthalate, polybutylene terephthalate, polyamide, polyoxymethylene, polyamide-imide, polyimide, polysulfone, polyether sulfone, polyether imide, polyether ether ketone, polyphenylene sulfide, modified polyphenylene ether, syndiotactic polystyrene, liquid crystal polymer, urea resin, unsaturated polyester, polyphenol, melamine resin, epoxy resin, and a copolymer including these materials.

In the case where the fiber 13 is formed by the electrospinning method, the above polymers are made into solutions. Examples of a usable solvent include a volatile organic solvent such as isopropanol, ethylene glycol, cyclohexanone, dimethylformamide, acetone, ethyl acetate, dimethylacetamide, N-methyl-2-pyrrolidone, hexane, toluene, xylene, methyl ethyl ketone, diethyl ketone, butyl acetate, tetrahydrofuran, dioxane, and pyridine; and water. Further, the solvent may be one kind selected from the above solvents or plural kinds may be mixed. The solvent that may be applied to the embodiment is not limited to the above solvents. The above solvents are shown only as examples.

In the case where the fiber 13 is formed by the electrospinning method, there can be more entangling of the fibers with each other. Thus, it is possible to spin and simultaneously form a nonwoven fabric fiber sheet. Further, by forming the fiber 13 via the electrospinning method, it is possible to obtain a fiber diameter of a micro-order to nano-order.

The fiber 13 preferably has a diameter of about 5 μm or less, more preferably a diameter of 1 μm or less (i.e., a nano-order diameter). Further, various kinds of inorganic fillers such as silicon oxide, metal hydroxide, carbonate, sulfate, and silicate may be added to the fiber 13. As the inorganic fillers to be added, for example, wollastonite, potassium titanate, xonotlite, gypsum fibers, aluminum borate, MOS (basic magnesium sulfate), aramid fiber, carbon fiber, glass fiber, talc, mica, and glass flake are considerable.

The support 14 is composed of, for example, an acrylic resin material and has strength capable of enduring stress. In the present case, the support 14 has a porous structure having fine voids. This results in reduction of weight of the support 14, and in turn, the weight of the core 11 and the structural body 10 can be reduced. The support 14 has a function of suppressing deformation of the core 11 due to stress and also a function of suppressing compression of the fiber 13. By including the support 14, the shape of the core 11 made of the fiber 13, in other words, the shape of the structural body 10 can be stably maintained. Further, the strength of the core 11 can be improved, and in turn, the strength of the structural body 10 can be improved. The support 14 preferably has a shape in which angular portions are rounded. In this case, it is possible to relax the force applied from the angular portions of the support 14 to the covering member 12.

The structural body 10 includes the support 14 in the core 11, whereby there is reduction in the amount of the fiber 13 that is used as compared to one in which the entire core 11 is formed of the fiber 13. Further, the structural body 10 includes the support 14 in the core 11, whereby the thickness of the fiber layer made of the fiber 13 is suppressed. In the case where an external force of some kind is applied to the core 11, the fiber 13 that compose the core 11 is compressed in correspondence to the applied force. However, in the structural body 10 according to the embodiment, the thickness of the fiber layer present between the covering member 12 and the support 14, namely, the amount of the fiber 13 is suppressed. Thus, as compared to the structure in which the fiber 13 is housed in the whole interior of the covering member 12, the compression amount of the fiber 13 can be suppressed.

In the structural body 10 according to the embodiment, with regard to a structural body 10 including a core 11 of a fiber 13, a support 14 for suppressing deformation of the core 11 is provided in the core 11. Accordingly, as compared to the structure in which the entire core is formed of a fiber, it is possible to improve the strength of the core 11, and in turn, it is possible to improve the strength of the entire structural body 10.

In the structural body 10 according to the embodiment, as the support 14 is porous, the weight of the support 14 can be reduced, and in turn, the weight of the core 11 and the structural body 10 can be reduced.

The structural body according to the embodiment includes a core made of fiber and a support, which is a component of the core, and suppresses deformation of the core. According to such a structure, it is possible to improve the strength of a structural body that includes a core made of fiber.

For example, the support 14 may be made of, for example, a metal material or an inorganic material, in addition to a resin material, and may be employed with the material changed as appropriate. Further, the fiber 13 need not be a resin fiber, and may be a glass fiber, or may be a fiber formed of a material including an organic compound. In the case where the fiber is composed of a fiber including an organic compound, the organic compound may be an organic compound derived from an organism. Further, the structural body 10 may be one in which the interior of the covering member 12 housing the core 11 is depressurized.

The structural body according to the embodiment can be used for various applications such as artificial joints, filters, pillows, packing materials for valuable items, and beds. Further, structural body can be used for seats such as seats mounted in automobiles, bullet trains (also known as Shinkansen), and airplanes; and child seats. Furthermore, it can be used for masks, adhesive bandages, conductive sheets, or the like. In the case of using the structural body according to the embodiment for, for example, artificial joints or adhesive bandages, the structural body is favorable as a member for providing a space for keeping moist. The structural body according to the embodiment can not only be used in air, but can also be used in a liquid. Further, the structural body can be used as a separator between mutually different environments.

The structural body of the embodiment will be further described.

According to the embodiment, there is provided a structural body including a porous layer.

The porous layer is one where one or plural fibers are accumulated, deposited, stacked, or assembled. In the porous layer, the fibers are entangled and are in contact with one another at plural places forming contact points. The fibers are disposed three-dimensionally in the porous layer. At the contact points, the fibers may be adhered or welded to each other or may be neither adhered nor welded to one another. The orientation of the fibers at the contact points may change due to external force applied to the porous layer, or the like. The porous layer may be considered as having a non-woven fabric shape.

The pores present in the porous layer may be any of independent pores, continuous pores, and through holes. Plural kinds of pores may be present (e.g., independent pores and continuous pores).

The fiber in the porous layer may include (a) an electrolyte and a first fiber including a thermosetting resin and (b) a second fiber that includes a resin with a density of 0.5 $g/cm^3$ to 3 $g/cm^3$ and has a diameter of 30 nm or more and less than 5 μm. Both of the first fiber and the second fiber may be included in the same porous layer. The first fiber and the second fiber may be the same fiber.

In a porous layer including the first fiber, the second fiber, or the first fiber and the second fiber, the average diameter, entangling degree, and arrangement of the fibers can be freely changed. Thus, it is possible to provide a structural body which can arbitrarily change the compressive strength.

The structural body can be used as a heat-insulating element, a biomaterial sheet, an insulating material, an insulating auxiliary material, a water droplet impact absorbing member, an adhesive layer, a barrier membrane or the like, in addition to the applications as described above.

Since the compressive strength can be increased in the porous layer including the first fiber, the second fiber with a density of 1 $g/cm^3$ to 2 $g/cm^3$, or both of these fibers, it is possible to reduce crushing of pores due to compression. As a result, the porous structure of the porous layer can be maintained for a long period of time, and thus the morphological stability of the porous layer is improved. Therefore, it is possible to realize a structural body having high morphological stability and excellent compressive strength. The structural body can be used as a heat-insulating element, a biomaterial sheet, an insulating material, an insulating auxiliary material, a water droplet impact absorbing member, an adhesive layer, a barrier membrane or the like, in addition to the applications as described above.

As a result of improvement in the compressive strength of the porous layer, the amount of the fiber that is used in the porous layer can be reduced, and the porosity can be increased. Accordingly, the porous layer can be configured to have a structure with a small fiber diameter and high porosity to enable the heat conductivity to be low, and thus the insulation properties of the structural body can be improved.

The thermosetting resin included in the first fiber is preferably a main component of the fiber. Here, main component means a component with the highest proportion among the components of the fiber. The amount of the thermosetting resin included in the fiber is preferably 50 wt % or more. Accordingly, the compressive strength of the porous layer can be improved.

The range of the dielectric constant of the thermosetting resin is preferably from 1 to 1000. Accordingly, a porous layer with high compressive strength and low heat conductivity is obtained. This is because control of the fiber formation becomes easy, when producing the porous layer by the electrospinning method, and thus, it becomes easy to make adjustments, such as making the fiber diameter smaller, making the arrangement (or entangling) of the fiber complicated, and the like. A more preferable range of the dielectric constant is from 50 to 1000. The dielectric constant can be measured, for example, by a resonator method.

An example of the thermosetting resin includes an epoxy resin. The dielectric constant of the epoxy resin is within a range of 1 to 1000.

The electrolyte contributes to improvement in the compressive strength and insulation properties of the porous layer including an epoxy resin-including fiber. The reason therefor is as follows. The electrolyte can increase the dielectric constant and electrical conductivity of the raw material solution used when producing a porous layer by the electrospinning method. As compared to the case of adding no electrolyte, the dielectric constant can be increased by about 2 to 100-fold, for example. As a result, control of the fiber formation in the electrospinning step becomes easy, and it becomes easy to make adjustments, such as making the fiber diameter smaller, making the arrangement (or entangling) of the fiber complicated, and the like. In addition to such an effect, the electrolyte can increase the conductivity of the epoxy resin-including fiber. Examples of the electrolyte include inorganic salts, ammonium salts, and ionic liquids. The electrolyte desirably has excellent affinity with thermosetting resins and excellent solubility in solvents. Examples of the inorganic salts include LiBr, LiCl, NaCl, LiCl, $MgCl_2$, NaOH, $KMnO_4$, and $K_2CrO_4$. Further, examples of the ammonium salts include $NH_4Cl$ and $NH_4Br$. On the other hand, examples of the ionic liquids include 1-butyl-3-methyl imidazolium hexafluorophosphate. The electrolyte may be one kind or two or more kinds. LiBr has excellent solubility in an organic solvent (e.g., cyclohexanone) used as a solvent for a raw material solution. LiBr also has an advantage of being inexpensive. Further, LiBr is thermally and chemically stable.

The amount of the electrolyte included in the first fiber may be within a range of 0.01 wt % to 10 wt %. When the amount of the electrolyte included is low, fibers having a thin diameter are not obtained. On the other hand, when the amount of electrolyte included is too high, there is concern that the amount of thermosetting resin included becomes insufficient, whereby the compressive strength of the porous layer decreases. More preferably, the range is from 0.1 wt % to 2 wt %.

The average diameter of the first fiber is preferably within a range of 30 nm to 5 μm. Thus, the heat conductivity of the porous layer can be reduced, thereby increasing heat-insulating properties. Further, the pressure loss of the porous layer can be reduced. A more preferable range is 30 nm or more and less than 5 μm, an even more preferable range is from 400 nm to 800 nm, and a yet even more preferable range is from 400 nm to 600 nm.

By setting the density of the resin included in the second fiber to a range of 1 $g/cm^3$ to 2 $g/cm^3$, the compressive strength of the second fiber can be increased. An example of the resin with a density of 1 $g/cm^3$ to 2 $g/cm^3$ includes an epoxy resin.

By setting the average diameter of the second fiber to a range of 30 nm or more and less than 5 μm, the heat conductivity of the porous layer can be reduced. Further, it becomes possible to reduce the pressure loss of the porous layer. Therefore, the porous layer including the second fiber has high compressive strength and low heat conductivity. A more preferable range is from 400 nm to 800 nm, and an even more preferable range is from 400 nm to 600 nm.

The thermal conductivities of the first fiber and the second fiber with a density of 1 $g/cm^3$ to 2 $g/cm^3$ are, for example, within a range of 0.01 W/m·K to 5 W/m·K. Here, the heat conductivity of the resin that compose the fiber is defined as a heat conductivity of fiber. The heat conductivity of the fiber including an epoxy resin is from 0.01 W/m·K to 5 W/m·K.

The porosity of the porous layer including at least one of the first fiber and the second fiber is preferably within a range of 45% to 95%. An increase in porosity enables the heat-insulating properties of the porous layer to be increased. More preferably, the porosity is within a range of 70% to 95%.

The porosity of the stack including plural porous layers is desirably within a range of 45% to 95%. An increase in porosity enables the heat-insulating properties of the porous layers to be improved. More preferably, the porosity is within a range of 70% to 95%.

A porosity $P_1$(%) of the porous layer is calculated from Formula (1) below.

$$P_1(\%) = \{(V_1 - V_2) \times 100\}/V_1 \qquad (1)$$

In Formula (1), $V_1$ represents a volume of the porous layer with the pores included, and is calculated from Formula (2) below based on a longitudinal length $L_1$ of the porous layer, a horizontal length $L_2$ of the porous layer, and a thickness $L_3$ of the porous layer. The volume $V_1$ including the pores of the porous layer is measured in a state in which the porous layer is not filled with a material such as a liquid. In the case that the porous layer is filled with a material such as a liquid, the measurement is performed after the material is removed by, for example, washing the porous layer. Each of the dimensions $L_1$, $L_2$, and $L_3$ is measured with a scale in a state where a porous layer produced on a substrate or support is removed from the substrate or support, and thereafter, the porous layer is placed on a flat surface.

$$V_1 = L_1 \times L_2 \times L_3 \quad (2)$$

$V_2$ represents a net volume of the porous layer, and is obtained by dividing the weight of the porous layer by the density of the porous layer.

A porosity $P_2(\%)$ of the stack is calculated from Formula (3) below.

$$P_2(\%) = \{(V_3 - V_4) \times 100\}/V_3 \quad (3)$$

In Formula (3), $V_3$ represents a stack volume which includes the pores of the stack, and is calculated from Formula (4) below based on a longitudinal length $L_4$ of the stack, a horizontal length $L_5$ of the stack, and a thickness $L_6$ of the stack. Stack volume $V_3$ including the pores of the stack is measured in a state in which the stack is not filled with a material such as a liquid. In the case where the stack is filled with a material such as a liquid, the measurement is performed after the material is removed by, for example, washing the stack. Each of the dimensions $L_4$, $L_5$, and $L_6$ is measured with a scale in a state in which the stack is placed on a flat surface.

$$V_3 = L_4 \times L_5 \times L_6 \quad (4)$$

$V_4$ is a net volume of the stack and is obtained by dividing the weight of the stack by the density of the stack.

The average diameters of the first fiber and the second fiber are measured by, for example, the method described below. The porous layer is observed with a scanning electron microscope (SEM). In this case, the porous layer is observed from a direction indicated by an arrow shown in FIG. 6. All diameters of the fibers in focus within the obtained image are measured. Here, the diameter of the fiber is the length of the short side in the projection view of the fiber with respect to the observation direction indicated by the arrow of FIG. 6. FIG. 16 shows a projection view 33 of a fiber 31 obtained by projecting the fiber 31 in the observation direction indicated by an arrow 32. In the example of FIG. 16, the projection view 33 is rectangular. A length L of the short side of the rectangular projection view 33 is defined as a diameter of the fiber 31. The average calculated from the obtained measured values is defined as an average diameter of the fiber. In this regard, the observation area and magnification are changed so that the number of fibers whose diameter is measurable is 10 or more.

The structural body of the embodiment may include a stack including plural porous layers. For the stack, integrating of the porous layers by pressing, binding the porous layers together with a container member, and the like may be performed. Examples using the container member include fitting the stack into a frame, disposing a plate-like member on the outermost layer of the stack and thereby sandwiching the stack, and housing the stack in a box-like container, a bag (e.g., the covering member 12), or the like.

The structural body of the embodiment may include a support. It is preferable that the support is superior in mechanical strength to the porous layer. Thus, by putting the support into contact with the core composed of the porous layer or fiber, the porous layer can be reinforced. Thereby, the deformation of the porous layer due to compression can be suppressed, and the shape of the structural body can be maintained stably. The support desirably has a porous structure. Accordingly, the weight of the support can be reduced, and in turn, the weight of the structural body can be reduced. The support preferably has a shape with angular portions rounded. Thus, it is possible to relax the force applied from the angular portions of the support to the container member. The support may be composed of, for example, an acrylic resin material.

The porous layer including at least one of the first fiber or the second fiber is produced by, for example, the electrospinning method. A main thermosetting resin agent and an electrolyte are dispersed or dissolved in an organic solvent to prepare a raw material solution that includes the main thermosetting resin agent and the electrolyte. A curing agent is added to the raw material solution and then preliminarily cured by heating. Using the preliminarily cured raw material, a porous layer is formed by the electrospinning method. A substrate is earthed and used as an earth electrode. The raw material solution is charged by the voltage applied to a spinning nozzle, and the charge amount per unit volume of the raw material solution increases due to volatilization of the solvent from the raw material solution. The volatilization of the solvent and a resulting increase in charge amount per unit volume occur continuously. The raw material solution discharged from the spinning nozzle thus spreads in a longitudinal direction and deposits on the substrate as a nano-sized thermosetting resin-including fiber. Coulomb force is generated between the thermosetting resin-including fiber and the substrate due to a potential difference between the nozzle and the substrate. Accordingly, the nano-sized thermosetting resin-including fiber enables the contact area with the substrate to be increased and the thermosetting resin-including fiber can be deposited on the substrate by the Coulomb force.

By including the electrolyte in the raw material solution, the dielectric constant and electrical conductivity of the raw material solution can be increased. As a result, the raw material solution can be sufficiently charged voltage is applied to the raw material solution. Thus, controlling the fiber to have a target diameter, controlling the arrangement of the fibers, and the like becomes easy. Setting the dielectric constant of the thermosetting resin within a range of 1 to 1000 contributes to improvement in the dielectric constant of the raw material solution. Thus, control of the fiber formation becomes even more easy.

As the organic solvent included in the raw material solution, the above described kinds of organic solvents may be used.

As the substrate, the support may be used or one different from the support may be used. In the case of using one different from the support, the porous layer formed on the substrate is used after being separated from the substrate. Examples of the substrate include paper and aluminum foil.

Figure 2:
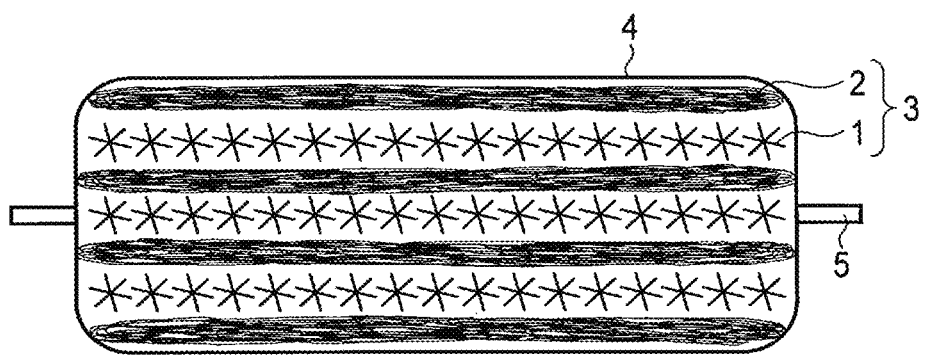
FIG. 2 is a cross-sectional view showing a configurational example of a structural body according to an embodiment.
Figure 3:
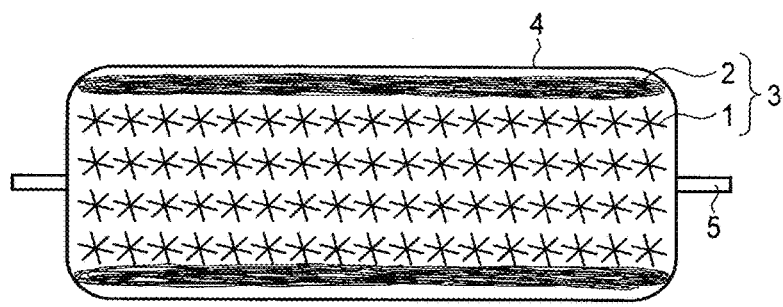
FIG. 3 is a cross-sectional view showing a configurational example of a structural body according to an embodiment.
Figure 4:
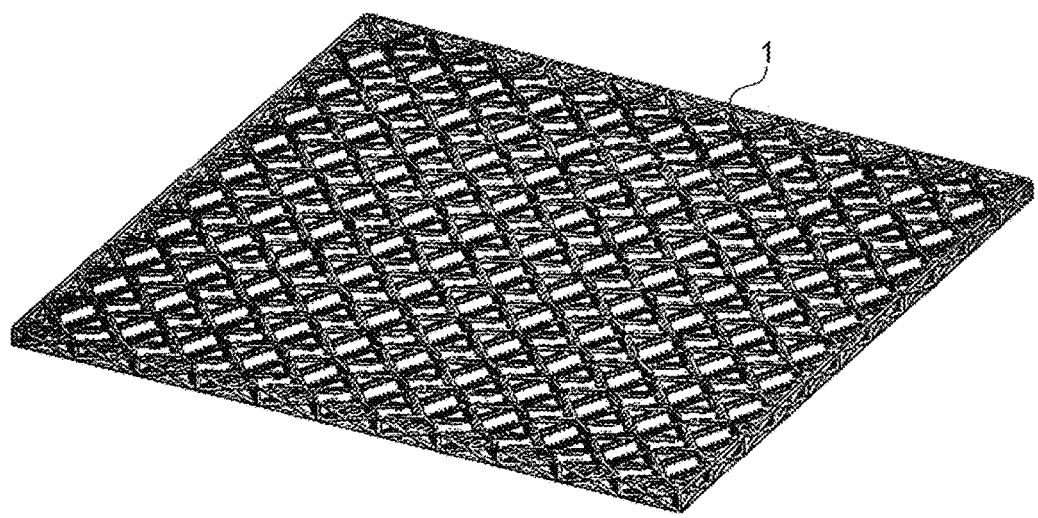
FIG. 4 is a perspective view showing an example of a support included in a structural body.
Figure 5:
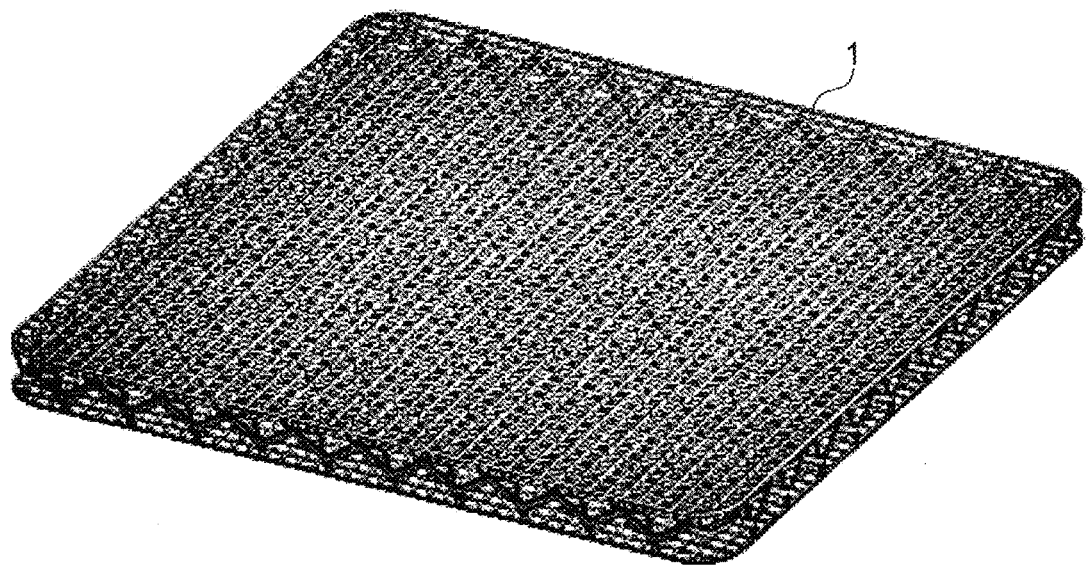
FIG. 5 is a perspective view showing another example of a support included in the structural body.
Figure 8:
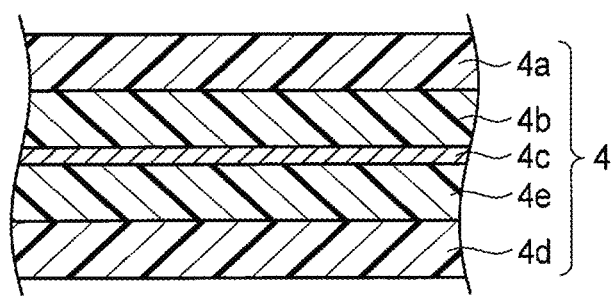
FIG. 8 is a cross-sectional view showing an example of a laminated structure of a laminate film.

FIGS. 2 and 3 show an example of the structural body of the embodiment. The structural body shown in FIG. 2 includes a stack 3 and a sac-like container member 4 in which the stack 3 is housed. The stack 3 includes plural supports 1 and plural porous layers 2. The support 1 has a porous structure, and may have the structure shown in FIG. 4 or 5. The support 1 shown in FIG. 4 is a metal mesh porous sheet. On the other hand, the support 1 shown in FIG. 5 is a lattice type porous sheet. Both of the sheets have R-shaped corners. In the stack 3, the supports 1 and the porous layers 2 are alternately stacked, and porous layers 2 are positioned at both of the outermost layers. The sac-like container member 4 is, for example, one obtained by processing a laminate film into a sac-like shape by heat sealing. Positioned at the side walls of the container member 4 are portions 5 where laminate films are adhered together by heat sealing. As the laminate film one can be used, for example, which includes a layer including aluminum or aluminum alloy and a resin layer. A specific example of the laminate film is shown in FIG. 8, but is not limited thereto. The laminate film 4 shown in FIG. 8 has a five-layered structure of from a first layer that composes the external surface of the container member 4 to a fifth layer that composes the inner surface of the container member 4. Polyethylene terephthalate (PET) is used for a first layer 4a, polyamide (PA) is used for a second layer 4b, a vapor-deposited aluminum layer is used for a third layer 4c, an ethylene-vinyl alcohol copolymer resin (EVOH) is used for a fourth layer 4e, and polyethylene (PE) is used for a fifth layer 4d. In the stack shown in FIG. 2, as long as the supports 1 and the porous layers 2 are alternately disposed, the support 1 may be disposed on one outermost layer and the porous layer 2 disposed on the other outermost layer, or alternatively, supports 1 may be disposed on both of the outermost layers.

The structural body shown in FIG. 3 has the same structure as that of FIG. 2 except that they differ in the arrangement of the supports 1 and the porous layers 2 in the laminate 3. In the stack 3, the porous layers 2 are disposed on both of the outermost layers of plural supports 1 that are stacked. One or two or more of the porous layers 2 may be disposed on each of the outermost layers.

Figure 6:
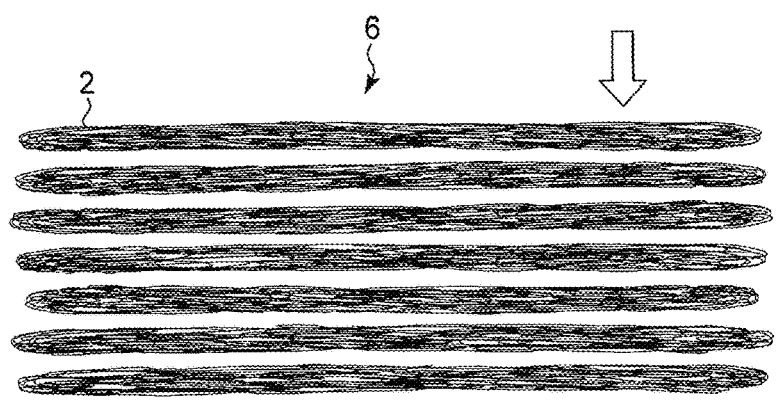
FIG. 6 is a cross-sectional view showing a configurational example of a structural body according to an embodiment.
Figure 7:
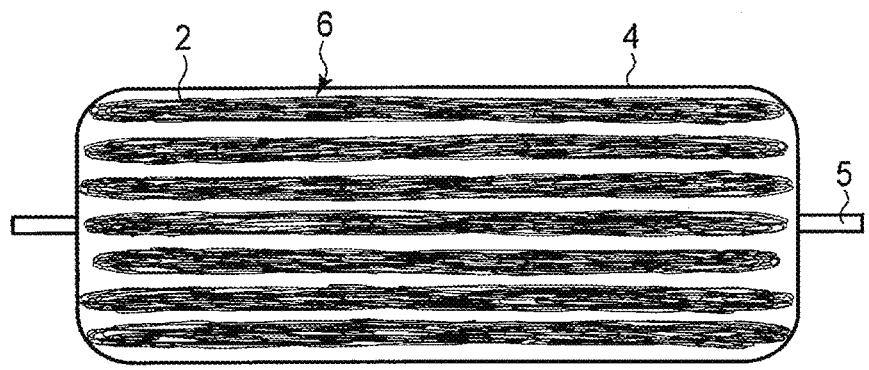
FIG. 7 is a cross-sectional view showing a configurational example of a structural body according to an embodiment.

Although the structural bodies shown in FIGS. 2 and 3 include the container member and the supports, the container member and the supports need not be included. For example, as shown in FIG. 6, a stack 6 of plural porous layers 2 may be used as a structural body of the first embodiment. As shown in FIG. 7, the stack 6 shown in FIG. 6 may be housed in the container member 4. In FIG. 7, the same reference numerals are given to the same members as those in FIGS. 2 and 3 and the description thereof is abbreviated.

By including the internal structure in the stack of the structural body as illustrated in FIGS. 2 and 3, deformation of the porous layers due to compression is suppressed. Thus, crushing of pores can be further reduced. Accordingly, the compressive strength of the stack can further be increased. As a result of improving the compressive strength, the amount of the fiber used for the porous layers can be reduced and the porosity can be increased. Thus, the structure can be made to have thin fiber diameter and high porosity, thereby further reducing the heat conductivity of the stack.

As illustrated in FIG. 2, when porous layers and supports are alternately disposed, a porous layer is positioned between the supports, and thus, the radiation heat transfer can be suppressed. Further, the heat conduction through the supports can be reduced by the porous layers.

On the other hand, by disposing the support between the porous layers as illustrated in FIG. 3, the structure of the stack can be simplified and easily produced.

The structural body of the embodiment can be used as a heat-insulating element, a biomaterial sheet, an insulating material, an insulating auxiliary material, a water droplet impact absorbing member, an adhesive layer, a barrier membrane or the like, in addition to the applications as described above.

In the case of the biomaterial sheet, examples of a substrate, on which the support or porous layer is formed, include a container such as a petri dish made of glass or resin, an adhesive bandage substrate, a sheet, and a porous body (e.g., one in the form of film or sponge, and which retains a liquid). Examples of the adhesive bandage substrate include urethane non-woven fabrics, vinyl chloride sheets, elastic cotton cloths, sponge sheets, urethane films, and olefin films.

FIG. 9 shows an example using a container, such as a petri dish, as the substrate. As shown in FIG. 9, an oriented collagen sheet 16 is placed in a petri dish 15, and the top of the oriented collagen sheet 16 is filled with a culturing medium 17. FIG. 10 shows an example of the oriented collagen sheet 16. The oriented collagen sheet 16 can be obtained, for example, by using a biomaterial such as collagen in place of a thermosetting resin such as an epoxy resin.

The porous layer, stack, or structural body of the embodiment can be used as an insulating material and/or an insulating auxiliary material. As illustrated in FIG. 11, a porous layer 19 impregnated with an insulating resin 20 can also be used as an insulating material and/or an insulating auxiliary material 18. As a material that composes the fiber, which can be used in place of, or in combination with the thermosetting resin, examples include polycarbonate (PC), polyether sulphone (PES), polyacrylonitrile (PAN), polyethylenenaphthalate (PEN), polyurethane (PU), urea-formaldehyde resin (UF), acrylic resin (PMMA), polyamide (PA), polystyrene (PS), polyimide (PI), and polyamide-imide (PAI).

The porous layer, the stack or the structural body of the embodiment can be used as a water droplet impact absorbing member. Examples of a substrate on which the support or the porous layer is temporarily formed include substrates made of resin, such as fiber reinforced plastics (FRP). An example is shown in FIGS. 12 and 13. FIG. 12 shows a main section including blades 21 of a wind turbine. Further, FIG. 13 shows a cross-sectional view taken along line XIII-XIII of the blade 21. As shown in FIG. 13, a surface of the blade 21 of the wind turbine can be covered with a porous layer 22. Accordingly, it is possible to relax the impact when droplets such as water drops hit the blade 21. As the material that composes the fiber, another resin can be used in place of, or in combination with the thermosetting resin. Examples of another resin include the same resins listed for the insulating material and the insulating auxiliary material.

Further, the porous layer, the stack, and the structural body of the embodiment can be used as an adhesive layer. As a result, the adhesive layer can be thinly and uniformly formed on the substrate. Furthermore, by filling or impregnating the pores of the porous layer in the adhesive layer with another adhesive agent, the adhesiveness of the adhesive layer can be improved. Alternatively, an ink, a magnetic material, or the like may be held in the pores the porous layer. Examples of a substrate on which the support or the porous layer is temporarily formed include thin substrates used for printing, such as paper, photographs, film, sheets, or the like. As a material that composes the adhesive layer, which can be used in place of, or in combination with the thermosetting resin, examples include aqueous adhesive agents, elastomeric adhesive agents, epoxy adhesive agents, cyano acrylic adhesive agents, vinyl adhesive agents, silicone rubber adhesive agents, and plastic adhesive agents. FIG. 14 shows an example in which a porous layer 24 as the adhesive layer is disposed between substrates 23a and 23b such as paper.

The porous layer, the stack, or the structural body of the embodiment may be formed on the surface of a barrier membrane used for gas separation or vapor liquid separation. Thus, the strength, weather resistance, and durability of the barrier membrane can be improved. Further, since the porous layer having fine fibers and high porosity is formed on the surface of the barrier membrane, the separation efficiency can be improved. An example is shown in FIG. 15. A porous layer 26 is formed on one surface of a barrier membrane 25 used for gas separation or vapor liquid separation. As the material that composes the fiber of the porous layer 26, another resin can be used in place of, or in combination with the thermosetting resin. Examples of another resin include those listed for the insulating material and the insulating auxiliary material.

As the fiber included in the porous layer described above, an inorganic nanofiber processed by calcination (e.g., $TiO_2$, $SnO_2$, $SiO_2$, $ZrO_2$, $Fe_2O_3$, $BaTiO_3$, or $NiFe_2O_4$) or a carbon fiber can be used in place of, or in combination with the above kinds of fibers.

EXAMPLES

Hereinafter, examples will be described in detail with reference to the drawings.

Example 1

To a main epoxy resin agent which had been diluted to 50 wt % with a solvent: N.N-dimethylformamide (DMF), 1 wt % of LiBr was added and dissolved to prepare a solution. To this solution, 40 wt % of curing agent with respect to the amount of main epoxy resin agent was added. The resultant mixture was preliminarily cured by heating to 70° C. and a raw material solution was obtained.

The obtained raw material solution was supplied from a spinning nozzle to the surface of a substrate using a metering pump at a supply rate of 1 mL/h. A high voltage generator was used to apply a voltage of 60 kV to the spinning nozzle. While conveying the substrate at a rate of 0.15/min and moving the spinning nozzle within a 200 mm distance perpendicular to the conveying direction of the substrate, a fiber was deposited on the surface of the substrate to form a porous layer. Aluminum foil was used as the substrate.

The fiber that compose the obtained porous layer included 99 wt % of epoxy resin and 1 wt % of LiBr. The epoxy resin had a density of 1.2 g/cm$^3$ and a dielectric constant of 11. Since the heat conductivity of the epoxy resin is defined as the heat conductivity of the fiber, the heat conductivity of the fiber is 0.3 W/m·K. The average diameter of the fibers was measured by the above method under SEM at 2000 times magnification, where the number of fibers whose diameter had been measured was 20, and the resulting average diameter was 800 nm. The porosity of the porous layer measured by the above method was 78%. The porous layer had a longitudinal length of 150 mm, a horizontal length of 150 mm, and a thickness of 21 mm.

As a support, a porous plate made of acrylic resin (polymethyl methacrylate: PMMA) having the structure shown in FIG. 5, a longitudinal length of 150 mm, a horizontal length of 150 mm, a thickness of 10 mm, and a porosity of 80% was prepared.

As shown in FIG. 2, porous layers and supports were alternately stacked to obtain a stack in which a porous film was positioned at both of the outermost layers. Specifically, 30 stacked porous layers were defined as one unit, and three units and two supports were alternately stacked to obtain a stack. The number of layered porous layers in the stack was 90 and the number of layered supports was 2. However, the number of layered porous layers and the number of layered supports are not limited thereto. The porosity of the stack was 80%.

The obtained stack was housed in a sac-like container member made of laminate film. After that, the interior of the container member was put in a vacuum state using a vacuum pump, and the container member was sealed by heat sealing to obtain a structural body. The laminate film has a 5-layered structure shown in FIG. 8. As the first layer 4$a$, a 16 µm thick polyethylene terephthalate (PET) layer is used. As the second layer 4$b$, a 30 µm thick polyamide (PA) layer is used. As the third layer 4$c$, a vapor-deposited aluminum layer with a thickness of less than 1 µm is used. As the fourth layer 4$e$, a 20 µm thick ethylene-vinyl alcohol copolymer resin (EVOH) layer is used. As the fifth layer 4$d$, a 60 µm thick polyethylene (PE) layer is used.

The heat conductivity of the obtained structural body of Example 1 measured with a thermal conductivity meter was 7 mW/m·K.

Example 2

A porous layer and a support produced in the same manner as in Example 1 were prepared. As shown in FIG. 3, the porous layers were stacked on both of the outermost layers of the support 1 to obtain a stack. The number of stacked layers of the porous layer was 10 per one side of the support. The porosity of the stack was 80%. The obtained stack was housed in a sac-like container member made of laminate film having the same 5-layered structure as that of Example 1. After that, the inside of the container member was put in a vacuum state using a vacuum pump and the container member was sealed by heat sealing to obtain a structural body.

The heat conductivity of the obtained structural body of Example 2 measured with a thermal conductivity meter was 6 mW/m·K.

Example 3

As a support, a porous plate made of acrylic resin having the structure shown in FIG. 4, a longitudinal length of 150 mm, a horizontal length of 150 mm, a thickness of 5 mm, and a porosity of 80% was prepared.

A raw material solution prepared in the same manner as in Example 1 was supplied from a spinning nozzle to a substrate using a metering pump at a supply rate of 1 mL/h. A high voltage generator was used to apply a voltage of 60 kV to the spinning nozzle. While conveying the substrate at a rate of 0.15/min and moving the spinning nozzle within a 200 mm distance perpendicular to the conveyance direction of the substrate, a fiber was deposited on the surface of the substrate to form a porous layer. Aluminum foil was used as the substrate.

The fiber that compose the obtained porous layer included 99 wt % of epoxy resin and 1 wt % of LiBr. The epoxy resin had a density of 1.2 g/cm$^3$ and a dielectric constant of 11. Since the heat conductivity of the epoxy resin is defined as the heat conductivity of the fiber, the heat conductivity of the fiber is 0.3 W/m·K. The average diameter of the fibers was measured by the above method under SEM at 2000 times magnification, where the number of fibers whose diameter had been measured was 20, and the resulting average diameter was 800 nm. The porosity of the porous layer measured by the above method was 80%. The porous layer had a longitudinal length of 150 mm, a horizontal length of 150 mm, and a thickness of 21 mm.

As shown in FIG. 2, porous layers and supports were alternately stacked to obtain a stack in which a porous film was positioned at both of the outermost layers. The number of layered porous layers in the stack was 50 per one unit of stacked porous layers. The porosity of the stack was 80%.

The obtained stack was housed in a sac-like container member made of laminate film having the same 5-layered structure as that of Example 1. After that, the inside of the container member was put in a vacuum state using a vacuum pump and the container member was sealed by heat sealing to obtain a structural body.

The heat conductivity of the obtained structural body of Example 3 measured with a thermal conductivity meter was 7 mW/m·K.

Example 4

A porous layer and a support produced in the same manner as in Example 3 were prepared. As shown in FIG. 3, the porous layers were stacked on both of the outermost layers of the support 1 to obtain a stack. The number of stacked layers of the porous layer was 10 per one side of the support. The porosity of the stack was 92%.

The obtained stack was housed in a sac-like container member made of laminate film having the same 5-layered structure as that of Example 1. After that, the inside of the container member was put in a vacuum state using a vacuum pump and the container member was sealed by heat sealing to obtain a structural body.

The heat conductivity of the obtained structural body of Example 4 measured with a thermal conductivity meter was 6 mW/m·K.

Example 5

A porous layer was formed in the same manner as in Example 1 except that 0.1 wt % of LiCl was used as an electrolyte in place of LiBr.

The fiber that compose the obtained porous layer included 99.9 wt % of epoxy resin and 0.1 wt % of LiCl. The density and dielectric constant of the epoxy resin, the heat conductivity and average diameter of the fiber, the porosity of the porous layer, and the longitudinal length, horizontal length, and thickness of the porous layer were the same as those of Example 1. Among these, a part of the data is shown in Table 1.

A structural body was produced in the same manner as in Example 1 except that the obtained porous layer was used. The heat conductivity of the structural body measured with a thermal conductivity meter is shown in Table 1.

Example 6

A porous layer was formed in the same manner as in Example 1 except that 0.1 wt % of benzyl-triethylammonium chloride was used as an electrolyte in place of LiBr.

The fiber that compose the obtained porous layer included 99.9 wt % of epoxy resin and 0.1 wt % of benzyl-triethylammoniumchloride. The density and dielectric constant of the epoxy resin, the heat conductivity and average diameter of the fiber, the porosity of the porous layer, and the longitudinal length, horizontal length, and thickness of the porous layer were the same as those of Example 1. Among these, a part data is shown in Table 1.

A structural body was produced in the same manner as in Example 1 except that the obtained porous layer was used. The heat conductivity of the structural body measured with a thermal conductivity meter is shown in Table 1.

Example 7

A porous layer was formed in the same manner as in Example 1 except that a main epoxy resin agent diluted to 45 wt % with a solvent: N,N-dimethylformamide (DMF) was used to adjust the average diameter of an epoxy resin-include fiber to 450 nm in the electrospinning step. The density and dielectric constant of the epoxy resin, the heat conductivity of the fiber, and the longitudinal length, horizontal length, and thickness of the porous layer were the same as those of Example 1. The porosity of the porous layer and the porosity of the stack are shown in Table 1.

A structural body was produced in the same manner as in Example 1 except that the obtained porous layer was used. The heat conductivity of the structural body measured with a thermal conductivity meter is shown in Table 1.

Example 8

Polystyrene was dissolved in a solvent: N,N-dimethylformamide (DMF) to prepare a 20 wt % solution. The prepared solution was used as a raw material solution.

The obtained raw material solution was supplied from a spinning nozzle to the surface of a substrate using a metering pump at a supply rate of 1 mL/h. A high voltage generator was used to apply a voltage of 60 kV to the spinning nozzle. While conveying the substrate at a rate of 0.15/min and moving the spinning nozzle within a 200 mm distance perpendicular to the conveyance direction of the substrate, a fiber was deposited on the surface of the substrate to form a porous layer. Aluminum foil was used as the substrate.

The fiber that compose the obtained porous layer included 100 wt % of polystyrene. The density and dielectric constant of polystyrene, the heat conductivity and average diameter of the fiber, and the porosity of the porous layer are shown in Table 1. The longitudinal length, horizontal length, and thickness of the porous layer were the same as those of Example 1.

As the support, the same acrylic resin porous plate as that of Example 1 was prepared.

A stack and a structural body were produced in the same manner as in Example 1. The porosity of the stack and the heat conductivity of the structural body measured with the thermal conductivity meter are shown in Table 1.

Example 9

30% of polyamide-imide was dissolved in a solvent: N,N-dimethylacetamide (DMAc) to prepare a 30 wt % solution. The prepared solution was used as a raw material solution.

The obtained raw material solution was supplied from a spinning nozzle to the surface of a substrate using a metering pump at a supply rate of 1 mL/h. A high voltage generator was used to apply a voltage of 60 kV to the spinning nozzle. While conveying the substrate at a rate of 0.15/min and moving the spinning nozzle within a 200 mm distance perpendicular to the conveyance direction of the substrate, a fiber was deposited on the surface of the substrate to form a porous layer. Aluminum foil was used as the substrate.

The fiber that compose the obtained porous layer included 100 wt % of polyamide-imide. The density and dielectric constant of polyamide-imide, the heat conductivity and average diameter of the fiber, and the porosity of the porous layer are shown in Table 1. The longitudinal length, horizontal length, and thickness of the porous layer were the same as those of Example 1.

As the support, the same acrylic resin porous plate as that of Example 1 was prepared.

A stack and a structural body were produced in the same manner as in Example 1. The porosity of the stack and the heat conductivity of the structural body measured with the thermal conductivity meter are shown in Table 1.

Comparative Example

A porous sheet formed of glass fiber was prepared. The porous sheet had a longitudinal length of 150 mm, a horizontal length of 150 mm, and a thickness of 1 mm. The density of the glass was 2.5 g/cm$^3$. Since the heat conductivity of the glass is defined as the heat conductivity of the fiber, the heat conductivity of the fiber is 1 W/m·K. The average diameter of the fiber measured in the same manner as in Example 1 was 5 μm. The porosity of the porous layer measured by the above method was 95%.

23 porous sheets were stacked to obtain a stack. The porosity of the stack was 92%. The obtained stack was housed in a sac-like container member made of laminate film having the same 5-layered structure as that of Example 1. After that, the inside of the container member was put in a vacuum state using a vacuum pump and the container member was sealed by heat sealing to obtain a structural body.

The heat conductivity of the obtained structural body of Comparative example measured with a thermal conductivity meter was 8 mW/m·K.

Regarding the structural bodies of Examples 1 to 9 and Comparative example, a stack was formed by stacking the fiber membrane layer so as to have a thickness of about 150 μm, and the displacement and reaction force were measured while pressing the stack with a contact pressure gauge (force gauge). The measurement results were plotted with the thickness of the stack on a horizontal axis and the reaction force on a vertical axis. A slope of the straight line obtained by connecting the resultant plots is shown in Table 1 as the compressive strength.

TABLE 1

|  | Resin of Fiber | Density of Resin (g/cm$^3$) | Dielectric Constant of Resin | Heat Conductivity of Fiber (W/m · K) | Average Diameter of Fiber (nm) | Porosity of Porous Layer (%) |
| --- | --- | --- | --- | --- | --- | --- |
| Example 1 | Epoxy resin | 1.2 | 11 | 0.3 | 800 nm | 78 |
| Example 2 | Epoxy resin | 1.2 | 11 | 0.3 | 800 nm | 78 |
| Example 3 | Epoxy resin | 1.2 | 11 | 0.3 | 800 nm | 80 |
| Example 4 | Epoxy resin | 1.2 | 11 | 0.3 | 800 nm | 80 |
| Example 5 | Epoxy resin | 1.2 | 11 | 0.3 | 800 nm | 78 |
| Example 6 | Epoxy resin | 1.2 | 11 | 0.3 | 800 nm | 78 |
| Example 7 | Epoxy resin | 1.2 | 11 | 0.3 | 450 nm | 82 |
| Example 8 | Polystyrene | 1.05 | 2.5 | 0.15 | 800 nm | 85 |
| Example 9 | Polyamide imide | 1.4 | 5 | 0.4 | 1200 nm | 80 |
| Comparative Example | Glass Fiber | 2.5 | 5 | 1 | 5 μm | 95 |

|  | Porosity of Stack (%) | Electrolyte | Structure of Stack | Structure of Internal Support | Heat Conductivity (mW/m · K) | Compressive Strength (kPa/mm) |
| --- | --- | --- | --- | --- | --- | --- |
| Example 1 | 80 | LiBr | FIG. 2 | FIG. 5 | 7 | −1551 |
| Example 2 | 80 | LiBr | FIG. 3 | FIG. 5 | 6 | −1551 |
| Example 3 | 80 | LiBr | FIG. 2 | FIG. 4 | 7 | −1551 |
| Example 4 | 92 | LiBr | FIG. 3 | FIG. 4 | 6 | −1551 |
| Example 5 | 80 | LiCl | FIG. 2 | FIG. 5 | 7 | −1551 |
| Example 6 | 80 | Benzyl-triethyl-ammonium chloride | FIG. 2 | FIG. 5 | 7 | −1551 |
| Example 7 | 82 | LiBr | FIG. 2 | FIG. 5 | 6 | −1551 |
| Example 8 | 80 | — | FIG. 2 | FIG. 5 | 15 | −1126 |
| Example 9 | 80 | — | FIG. 2 | FIG. 5 | 10 | −1300 |
| Comparative Example | 92 | — | — | — | 8 | −1700 |

As is apparent from Table 1, the structural bodies of Examples 1 to 7 produced using epoxy resin have low heat conductivity, compared to the structural bodies of Examples 8 and 9 and Comparative example. The structural bodies of Examples 1 to 7 produced using epoxy resin are superior in compressive strength, compared to the structural bodies of Examples 8 and 9 produced using another resin material and have low heat conductivity.

According to the structural body of at least one of the above embodiments and examples, includes a porous layer including an electrolyte and a first fiber that includes a thermosetting resin and/or a second fiber that includes a resin with a density of 0.5 g/cm$^3$ to 3 g/cm$^3$ and has an average diameter of 30 nm to 5 μm. Accordingly, a structural body capable of arbitrarily changing the compressive strength can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A structural body, comprising
at least one porous layer that includes a fiber including an electrolyte and a thermosetting resin,
wherein
the thermosetting resin is a component with a highest proportion among a plurality of components of the fiber,
the thermosetting resin is an epoxy resin, and
an amount of the electrolyte in the fiber ranges from 0.01 wt % to 10 wt %.

2. The structural body according to claim 1, wherein the electrolyte is lithium bromide.

3. The structural body according to claim 1, wherein the fiber has an average diameter of 30 nm to 5 μm.

4. The structural body according to claim 1, wherein a dielectric constant of the thermosetting resin is within a range of 1 to 1000.

* * * * *